United States Patent [19]
Jakel

[11] 3,899,344
[45] Aug. 12, 1975

[54] FIBER REINFORCED CONCRETE PRODUCTS AND THEIR FORMATION

[75] Inventor: Gus R. Jakel, Los Angeles, Calif.

[73] Assignee: California Cement Shake Co., Inc., Alhambra, Calif.

[22] Filed: July 16, 1973

[21] Appl. No.: 379,749

Related U.S. Application Data

[63] Continuation-in-part of Ser. No. 303,677, Nov. 6, 1972.

[52] U.S. Cl. ................................................. 106/99
[51] Int. Cl. ............................................. C04b 7/02
[58] Field of Search ...................... 106/99, 90, 93

[56] References Cited
UNITED STATES PATENTS

| | | | |
|---|---|---|---|
| 3,044,547 | 7/1962 | Jarboe | 106/99 |
| 3,368,623 | 2/1968 | Carter | 106/99 |
| 3,607,825 | 9/1971 | Shannon | 106/99 |
| 3,645,961 | 2/1972 | Goldfein | 106/99 |
| 3,679,445 | 7/1972 | Howe | 106/99 |
| 3,753,749 | 8/1973 | Nutt | 106/99 |
| 3,758,319 | 9/1973 | Ergene | 106/99 |

*Primary Examiner*—J. Poer
*Attorney, Agent, or Firm*—William W. Haefliger

[57] ABSTRACT

A reinforced, relatively flexible, concrete product is formed by:
a. combining Portland cement, polyester fibers, selected aggregate and water to form an aqueous admixture, and
b. forming the product from the admixture and curing the product.

4 Claims, 10 Drawing Figures

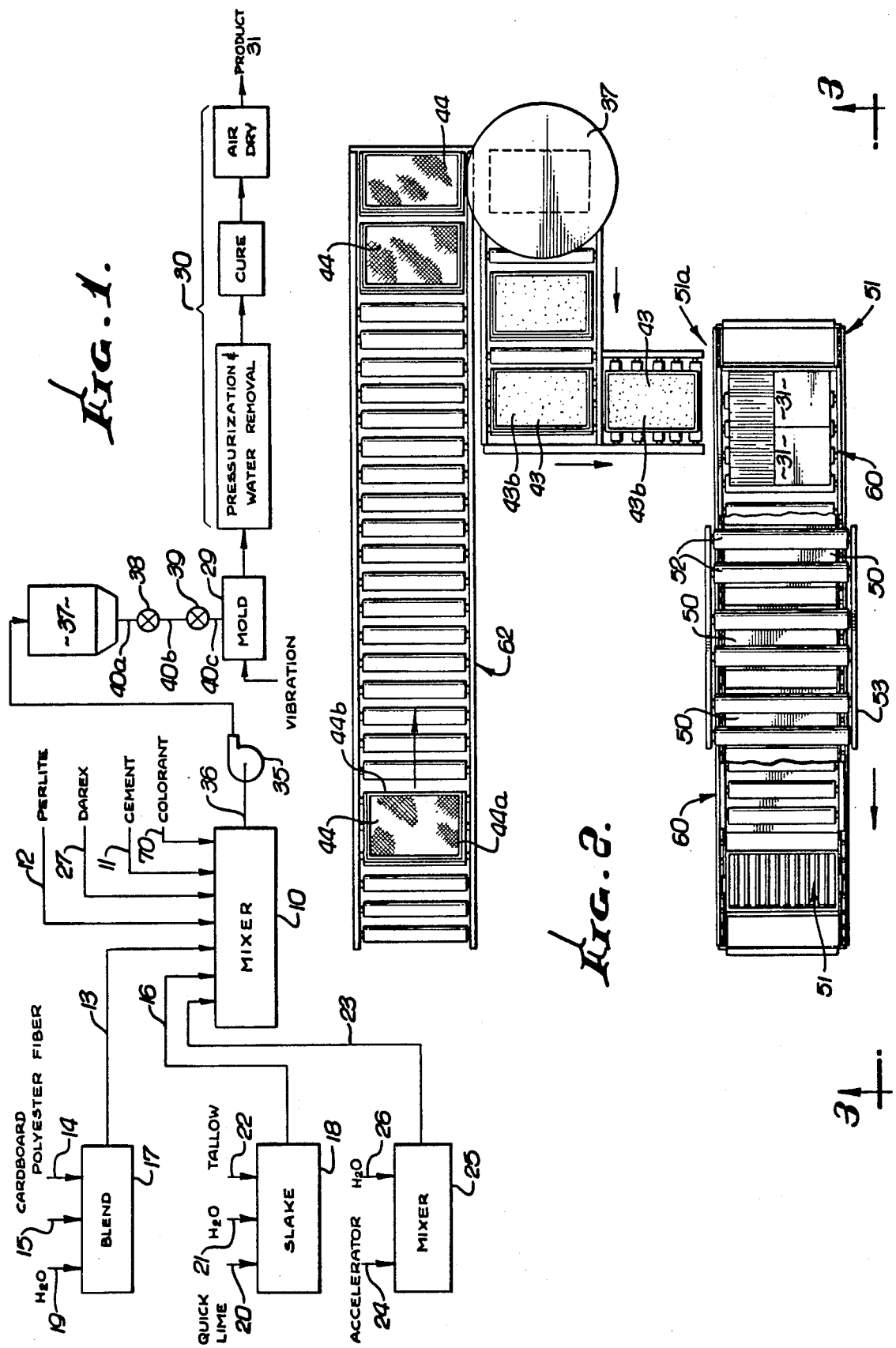

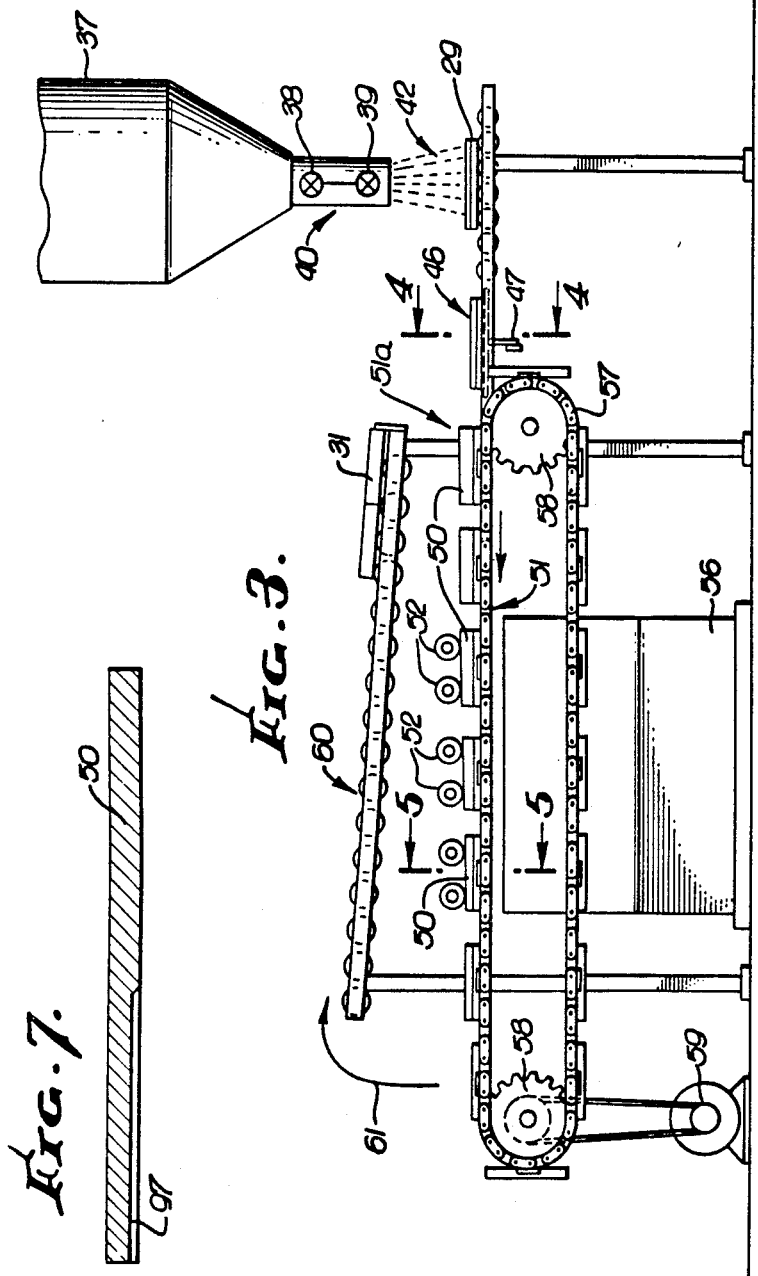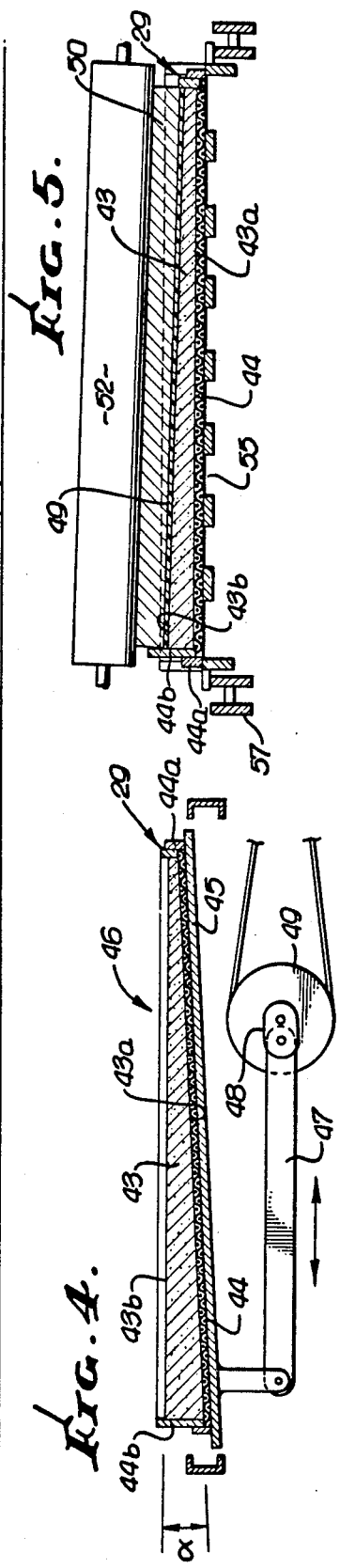

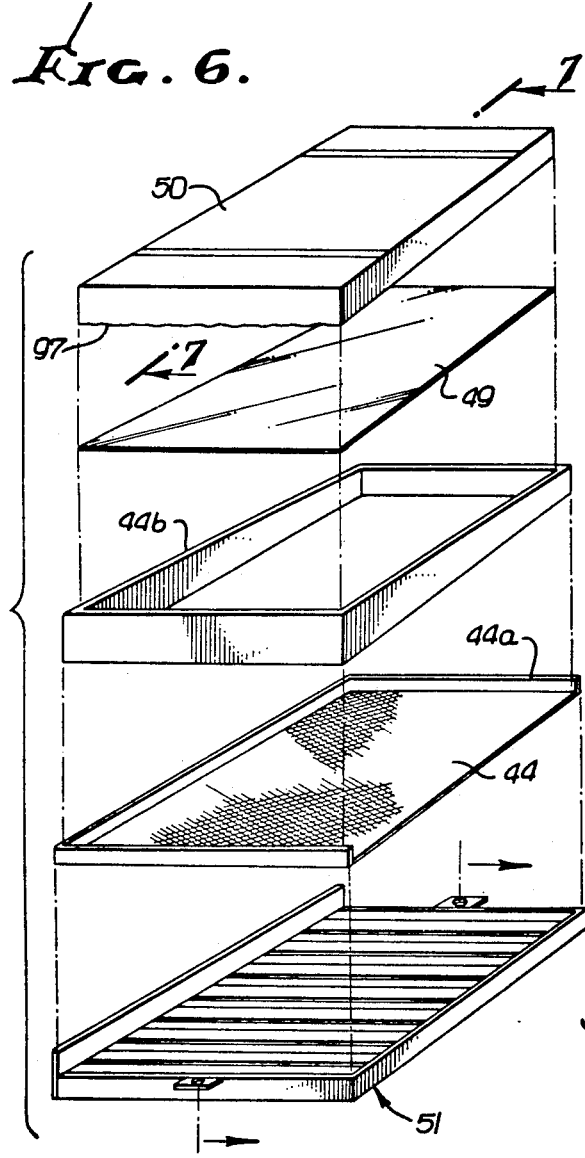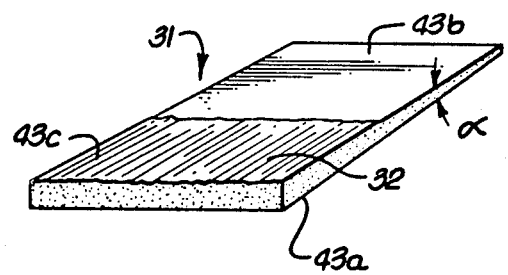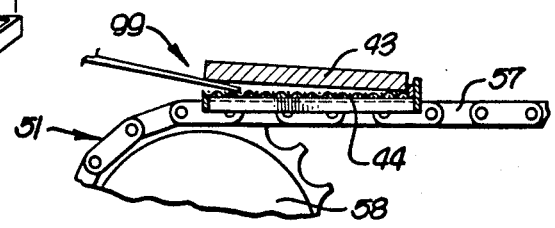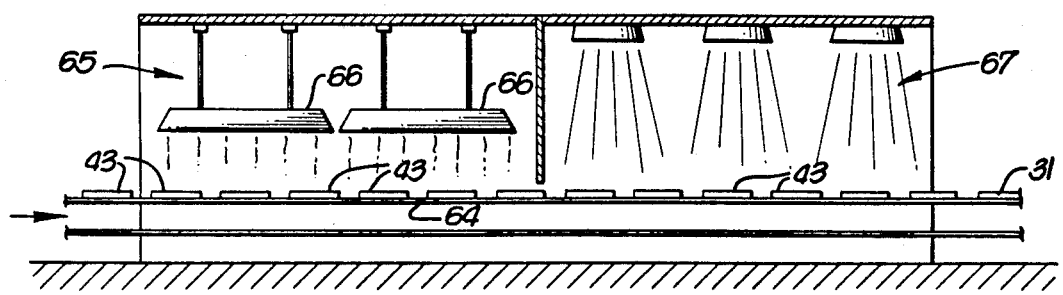

3,899,344

FIBER REINFORCED CONCRETE PRODUCTS AND THEIR FORMATION

BACKGROUND OF THE INVENTION

This application is a continuation-in-part of my copending application Ser. No. 303,677, filed Nov. 6, 1972, and entitled, "Cementitious Roofing and Siding".

This invention relates generally to reinforced, relatively flexible, concrete product and the method of making same, some examples of such products being slabs, roofing, siding and shingles.

As described in my prior application, there is a continuing need for products as referred to which have the following characteristics: relatively light weight, fireproof, waterproof, nailable, insulative and relatively inexpensive. For example, there is a need for fireproof, cementitious shake roofing which will not impose loads of more than 700 pounds per 100 square feet of roof area, to meet standard codes.

There is also a need for concrete products which are characterized as reinforced and also as relatively flexible, so that they will not easily fracture under impact, and will not separate even in fractured, these characteristics being present even after the product has been subjected to high temperature. For example, in the case of roofing and shingles, it is highly desirable that the shingles do not crack under impacts that may occur during their installation (workmen walking on them), and that even if cracked, the shingle sections will not separate and fall off the building with risk of harm to persons on the ground. These qualities should continue to be present even after subjection to high temperature, i.e. 1,800°F, as may occur during a fire in the building. In this regard, it is found that fibers such as nylon, as described in U.S. Pat. No. 3,645,961, do not withstand such high temperatures, and in fact deteriorate, losing substantial strength, as through cracking and crazing.

SUMMARY OF THE INVENTION

It is a major object of the invention to provide a reinforced, relatively flexible, concrete product, and method of making same, and it is a further object to provide a cementitious slab product (as for example roofing, siding and shingles) having the qualities of strength, flexibility, cohesiveness even after fracture, and fire resistance as referred to.

Basically, the process of making the product includes the steps of combining Portland cement, polyester fibers, selected aggregate and water to form an aqueous admixture; and forming the product from the admixture and curing same. As will appear, the fibers may with unusual advantage comprise between 0.05 and 0.15 percent by weight of the admixture and be about ¾ inch in length. Further, in the case of roofing or siding production, the selected aggregate may include perlite, cellulose pulp and slaked lime. It will be understood, however, that products other than roofing, shingles and siding are contemplated, the description herein comprising only one example of product production.

These and other objects and advantages of the invention, as well as the details of an illustrative embodiment, will be more fully understood from the following description and drawings, in which:

DRAWING DESCRIPTION

FIG. 1 is a flow diagram;

FIG. 2 is a plan view of pressurization and water removal apparatus;

FIG. 3 is a side elevation showing the FIG. 2 apparatus;

FIG. 4 is an enlarged sectional elevation taken on lines 4—4 of FIG. 3;

FIG. 5 is an enlarged sectional elevation taken on lines 5—5 of FIG. 3;

FIG. 6 is an exploded perspective showing of shake molding components, as used during curing;

FIG. 7 is a section taken in elevation on lines 7—7 of FIG. 6;

FIG. 8 is an enlarged elevation showing shake removal from the FIGS. 2 and 3 apparatus;

FIG. 9 is a perspective showing of the product shake; and

FIG. 10 is a section taken in elevation through product curing apparatus.

DETAILED DESCRIPTION

In the drawings, an aqueous admixture is formed at 10 by combining Portland cement 11, perlite 12 (volcanic glass powder), an aqueous feed streem 13 of polyester fiber 14 and cellulose 15 (such as cardboard), and a slaked lime feed stream 16. As will appear, the polyester fiber and cellulose may be preliminarily blended with water 19 and 17, and the slaked lime feed may be preliminarily formed at 18 by combining quick lime 20, water 21 and tallow 22. Further, an aqeuous feed stream 23 may be added to the mix at 10, stream 23 consisting of an accelerator 24 pre-blended at 25 with water 26. Finally, a small amount of Darex may be added at 27 to the mix 10, with colorant addition at 70. Roofing or siding slabs may be formed from the mix as indicated, for example, by the molding step 29, and the slabs are cured as indicated at 30 to produce the product at 31. As previously brought out, the product is characterized as relatively lightweight, flexible, fireproof, inexpensive, waterproof, resilient enough to be sawable and nailable and highly thermally insulative. In particular, the mix is unusually well adapted to molding and curing in the form of shingles such as roof "shakes" having decorative undulations as seen at 32 in FIG. 9.

More particularly, best results are achieved when the constituents of the admixture at 10 are present in the following relative amounts:

a. Between 180 and 195 pounds of Portland cement
b. Between 72 and 90 pounds of Perlite
c. Between 4 and 8 ounces of Darex
d. Between 38 and 46 gallons of feed stream 13
e. Between 7 and 9 gallons of feed stream 16
f. Between 0.6 and 1 gallons of feed stream 23.

Portland cement is used to provide fireproofing, and Perlite makes the product lightweight and permits sawing and nailing.

One example of the foregoing is as follows: combine 44 gallons of feed stream 13, ¾ gallons of feed stream 23, 4 ounces of Darex, and a selected colorant, if desired, and mix for 1 minute. Next add 8 gallons of feed stream 16 and 188 pounds of Portland cement ot the admixture and mix for 2 minutes. Finally, add 84 pounds of Perlite (Redco Inc type 27) to the admixture and mix for 4 minutes. The resultant admixture is then ready to be processed as at 29 and 30 for formation of the product. Darex, a product of W. R. Grace Co., consists of an air entraining agent.

Referring to the blending step 17, for best results and in terms of relative amounts between 40 and 48 pounds of scrap cardboard is combined with between 8 and 12 pounds of polyester fiber (adding strength and resilience or flexibility to the product) and between 350 and 375 gallons of water, for blending to produce a homogeneous pulp providing feed stream 13. In the slaking process designated at 18, for best results and in terms of relative amounts, between 45 and 55 pounds of quick lime is combined with between 25 and 30 gallons of water to react exothermically due to rapid hydration. Between 1.5 and 2.5 gallons of tallow is then added and blended in the hot mix (for waterproofing of the product) and to produce feed stream 16. Finally, in the mixing process designated at 25, between 3 and 5 pounds of accelerator powder is dissolved in between 1 and 3 gallons of hot water to produce feed stream 23. One unusually advantageous accelerator (which tends to cause the product to set up rapidly and assists in the waterproofing) consists principally of calcium chloride, calcium nitrate and potassium chloride, and has the following approximate composition, on a relative weight basis:

| | |
|---|---|
| $CuCl_2$ | 1.3% |
| KCL | 6.0% |
| $CaCl_2$ | 50.1% |
| $Al_2(SO_4)_3$ | 2.7% |
| $Ca(NO_3)_2$ | 15.9% |
| Other (water and impurities) | balance |

One example of the foregoing is as follows: 4 pounds of accelerator powder, as for example Berylex compound (a product of Berylex National Sales division of Harry Warde and Co., Kansas City, Mo.) is dissolved in 2 gallons of hot water to produce stream 23.

A typical mix at 10 has the following weight percent composition:

| Ingredient | Weight Percentage | Range |
|---|---|---|
| Water | 57.91 | 55 to 60 |
| Waste Cardboard (organic) | .75 | .50 to 1.0 |
| Polyester | .10 | .05 to .15 |
| Berylex | .20 | .20 to .50 |
| Lime | 2.2 | 2.0 to 3.0 |
| Tallow (organic) | .52 | .4 to 1.0 |
| Darex | .03 | .02 to .04 |
| Color | 1.1 | 0 to 2.0 |
| Cement | 25.66 | 20 to 30 |
| Perlite | 11.6 | 10 to 15 |

Referring again to FIG. 1, 35 designates a pump whose intake is connected to the outlet 36 of mixer 10, and whose outlet delivers to mix to a hopper 37. From the latter, controlled amounts of the mix are gravity fed to mold 29 as via a lock defined by upper and lower valves 38 and 39 connected in the delivery line 40 defined by stretches 40a, 40b and 40c.

Extending the description of FIGS. 3, 4 and 6 the mix is delivered at 42 into mold 29, where is assumes slab form 43 and is supported on a flat screen 44, which is inclined a few degrees from horizontal, as shown. The screen is in turn supported by inclined plate 45. Further, a rectangular frame 46 supported on plate 45 fits within screen frame 44a and confines the periphery of the slab to have rectangular shape.

Next, the above assembly is transferred to a station 46 and subjected to generally horizontal and rapid vibration. For this purpose, the plate 45 may be connected by link 47 to a small crank 48 rotated by a driven rotor 49. For example, the vibration amplitude may be about ⅜ inch and the frequency about 300 cycles per minute. As a result, the top surface of the uncured material defining the slab 43 assumes a horizontal level, while the overall slab itself is tapered. Note that plate 45 may support the screen 44 and the underside 43a of the slab at an angle $\alpha$ from horizontal, during such vibration, to form the slab with product shake tapered angularity as also appears in FIG. 9. Thereafter the assembly is transferred (as at 51a in FIG. 2) onto a conveyor 51, and a thin separator sheet 49 (as for example a plastic film) is placed over the top surface 43b of the material 43. A rectangular mold and pressure plate 50 is placed over that sheet and fitted in the frame 46. Upon movement of the conveyor 51 to the left in FIGS. 2 and 3, the plate 50 is successively increasingly pressurized by a series of angled compression rollers 52 which may be interconnected as at 53. As a result, the mold plate 50 transmits increasing pressure transferred through the film 49 to the slab 43, for squeezing water from the material, in order to aid in curing of the latter. The paper pulp fibers retain the cement in the product during such pressing. Also, an irregularly striated surface may be formed on the material as at 43c in FIG. 9, the mold plate having a correspondingly striated surface 97 facing the slab.

The conveyor itself may have drain passages 55 formed therein, as seen in FIG. 5, and water removed from the material may be collected in a trough indicated at 56 in FIG. 3. Endless conveyor chains are seen at 57, with sprockets 58 and drive 59. Following completion of such pressurization, the mold plates are removed and placed on an inclined return conveyor 60, such transfer of the plates being indicated by arrow 61 in FIG. 3. The frame 46 is removed from the product slab 43, and the latter may be scooped off the screen 44 as indicated at 99 in FIG. 8. The screen 44 (and associated frame 44a together with the frame 46 may be placed on a return conveyor 63 seen in FIG. 2, for transfer and re-use in the manner previously described.

Finally, the tapered slab 43, after removal of the separator sheet 49, may be placed on a support 64 in oven 65 seen in FIG. 10, and subjected to heat radiation from lamps 66, after which the shakes are air dried in chamber 67 and heated to complete the cure. As will be clear, the apparatus is especially well adapted to forming cementitious shakes on a production line basis.

The use of a 20 mesh, 0.016 inch screen 44 allows the product to be easily removed, intact, off the screen and without locking, at 99 in FIG. 8.

One example of the polyester fibers to be added is 3.0 denier, ¾ inch, type D-232 polyester staple, a product of Fiber Industries, Inc., Shelby, N.C., the fibers known commercially as FORTREL. "Polyester" fiber is a long chain, synthetic polymer composed of at least 85% by weight of an ester of dihydric alcohol and terephthalic acid (p-HOOC—$C_6H_4$—COOH). Also, the polyester, for best results must be "straight drawn", rather than crimped, so that it will not "ball" when mixed in the admixture.

In a strength test two identical shingles were formed, the first having the mix composition described herein at (i.e. 0.10 weight percent polyester fiber), and the second having the same composition excepting that the polyester fiber was replaced by glass fibers, in the amount of 0.03 weight percent. Both were subjected to the same bending strength test, the second failing (breaking) after a deflection of 0.320 inches, whereas the first underwent 0.640 inches deflection before failure.

I claim:

1. In the process of making a reinforced, relatively flexible concrete slab product, the steps that include
   a. combining the following constituents in the stated relative amounts to form an aqueous admixture:
      between 180 and 195 pounds of Portland cement
      between 72 and 90 pounds of perlite
      between 38 and 46 gallons of aqueous cellulose pulp and polyester fibers, and
      between 7 and 9 gallons of slaked lime, and
   b. forming the product from said admixture and curing the product,
   c. said polyester fibers comprising between 0.05 and 0.15 percent, by weight, of the admixture and being straight.

2. The process of claim 1 wherein the forming step comprises molding tapered product roofing shingles.

3. The process of claim 1 wherein substantially all the fibers are about ¾ inch in length.

4. The product shingles formed by the process of claim 2.

* * * * *